(12) United States Patent
Uenaka

(10) Patent No.: US 6,389,228 B1
(45) Date of Patent: May 14, 2002

(54) DEVICE FOR CORRECTING A TREMBLE OF A FOCUSED IMAGE AND A CAMERA WHICH IS PROVIDED WITH THE SAME

(75) Inventor: Yukio Uenaka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,458

(22) Filed: Apr. 7, 2000

(30) Foreign Application Priority Data

Apr. 9, 1999 (JP) .......................................... P11-102738

(51) Int. Cl.⁷ .......................... G03B 17/00; H04N 5/228
(52) U.S. Cl. .......................................... 396/55; 348/208
(58) Field of Search ............................. 396/52, 53, 54, 396/55; 348/208; 359/554, 555, 556, 557

(56) References Cited

U.S. PATENT DOCUMENTS

| 5,305,040 A | 4/1994 | Enomoto |
| 5,541,693 A | 7/1996 | Enomoto |
| 5,583,597 A | 12/1996 | Enomoto |
| 5,655,157 A | 8/1997 | Enomoto |

FOREIGN PATENT DOCUMENTS

| EP | 0587432 | 3/1994 | |
| EP | 0845699 | 6/1998 | |
| JP | 6-98246 | 4/1994 | |
| JP | 6-165020 | 6/1994 | |
| JP | 7-230107 | 8/1995 | |
| JP | HEI-7-230107 | * 8/1995 | ............ G03B/5/00 |
| JP | 7-261230 | 10/1995 | |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A previous displacement of the optical axis along a horizontal axis (or a vertical axis) detected at a previous performance of the frequency judging routine and a present displacement of the optical axis detected at a present performance are compared. It is judged whether a focused image tremble successively faces toward one direction or the direction of the tremble is reversed, based on combination of the result of the comparison and a previous direction of the focused image tremble. If the direction is reversed, and the focused image tremble is not caused by a hand tremble, the correction of the focused image tremble is stopped. It is judged that the focused image tremble is not caused by the hand tremble, when an elapsed time from a previous reverse of the focused image tremble to a present reverse of the focused image tremble is less than 25 milliseconds, and the amplitude of the focused image tremble is larger than a threshold value.

11 Claims, 11 Drawing Sheets

DEVICE FOR CORRECTING A TREMBLE OF A FOCUSED IMAGE AND A CAMERA WHICH IS PROVIDED WITH THE SAME

BACKGROUND OF THE INVENTION

1. Field of the Invention

This invention relates to a device for correcting a tremble of a focused image of an object caused by an oscillation of an optical device due to, for example, a hand tremble.

2. Description of the Related Art

Usually, an optical device is provided with a device for correcting a tremble of an focused image. The device for correcting the tremble includes a sensor of angular speed, and a correcting optical system which is placed on an optical path of a photographing optical system of the optical device. An amount of trembling of the optical device is calculated by integrating a signal output from the sensor of angular speed. The correcting optical system is driven so that the tremble of the focused image, caused by an oscillation of the optical device, is canceled.

Accordingly, a movement of an object image on, for example, a surface of a camera film and a light receiving surface of photoelectric conversion element is corrected. Namely, the focused image tremble of the object is corrected. In practice, due to a frequency characteristic of the driving device of the correcting optical system, the movement of the correcting optical system follows the focused image tremble, being shifted by a predetermined phase.

Therefore, when the frequency of the focused image tremble becomes high, a phase delay is generated between the focused image tremble and the drive of the correcting optical system, so that the response characteristic of the correcting optical system becomes comparatively slow. Due to the comparative slowness of the correcting optical system in responding to the focused image tremble, the correcting optical system may be driven in an opposite direction to a direction in which the correcting optical system should be driven in order to respond to the focused image tremble. Accordingly, the focused image tremble becomes larger than when the device for correcting the focused image tremble is not operated.

For example, when a camera is fixed on a tripod for photographing and a shutter button is pressed, the tripod is trembled in accordance with an oscillation of a release shock, by pressing the shutter button. The release shock is transmitted to the camera, after being amplified. Accordingly, if the correcting operation of the focused image tremble is performed when the camera is fixed on the tripod, the focused image tremble is amplified by the above mentioned movement of the correcting optical system, so that a picture quality of a photographed image is lowered.

SUMMARY OF THE INVENTION

Therefore, an object of the present invention is to provide a device for correcting the focused image tremble, which can be controlled in accordance with a frequency of the tremble. Another object of the present invention is to provide a camera, provided with the correcting device.

In accordance with an aspect of the present invention, there is provided a device for correcting a tremble of a focused image comprising: a tremble detector that detects a tremble of optical axes of an optical device; correction optical systems that correct the tremble of the optical axis; driving devices that drive the correction optical systems; a controlling system that controls the driving devices in such a manner that a tremble of a focused image of an object due to the tremble can be canceled; a reverse detector that detects a reverse of a direction of the optical axes tremble, detection of the reverse detector being repeatedly performed at a predetermined time interval; and a measuring system that measures a time interval, from a previous moment at which the reverse was detected, to a present moment at which the reverse is detected.

In the correction device, the controlling system stops the driving devices if the time interval is shorter than a predetermined value. The predetermined value is set to approximately 25 milliseconds.

Preferably, the correcting device further comprises a tremble-direction-memorizing-system that judges a direction of the tremble by comparing a previous amount of the tremble at the previous moment and a present amount of the tremble at the present moment, and memorizes the direction. In the correcting device, when a present direction of the tremble judged at the present moment by the tremble-direction-memorizing-system is different from a previous direction of the tremble judged at the previous moment by the tremble-direction-memorizing-system, a reverse of the direction of the tremble is detected.

Preferably, the tremble-direction-memorizing-system judges the direction of the tremble by detecting an increase and a decrease between the previous amount and the present amount.

Preferably, the tremble detector can detect the tremble of the optical axis along two axes, and when the time interval, measured by the measuring system based on the result of detection of the reverse detector, is less than a predetermined value with respect to one axis of the two axes, the controlling system stops the correcting operation with respect to the two axes.

In accordance with another aspect of the present invention, there is provided a camera which is provided with a device for correcting a tremble of a focused image comprising: a photographing optical system; a tremble detector that detects a tremble of an optical axis of the photographing optical system; a correction optical system that corrects the tremble of the optical axis; a driving device that drives the correction optical system; a photographing controlling system that records an image of the object, controlling an image capturing operation; a tremble correction controlling system that controls the driving device in such a manner that a tremble of a focused image of an object due to the tremble can be canceled; a reverse detector that detects a reverse of a direction of the optical axis tremble, detection of the reverse detector being repeatedly performed at a predetermined time interval; and a measuring system that measures a time interval, from a previous moment at which the reverse was detected, to a present moment at which the reverse is detected.

In the camera, the tremble correction controlling system stops the driving device if the time interval is shorter than a predetermined value. Preferably, the predetermined value is set to approximately 25 milliseconds.

Preferably, in the camera, only while the image capturing operation is being carried out, the reverse detection by the reverse detector, the measuring of the interval by the measuring system, and the stopping operation of the driving device by the tremble correction controlling system are carried out.

Preferably, the camera further comprises a tremble-direction-memorizing-system that judges a direction of the tremble by comparing a previous amount of the tremble at the previous moment and a present amount of the tremble at the present moment, and memorizes the direction. In the camera, when a present direction of the tremble judged at the present moment by the tremble-direction-memorizing-system is different from a previous direction of the tremble judged at the previous moment by the tremble-direction-memorizing-system, a reverse of the direction of the tremble is detected.

Preferably, the tremble-direction-memorizing-system judges the direction of the tremble by detecting an increase and a decrease between the previous amount and the present amount.

Preferably, in the camera, the tremble detector can detect the tremble of the optical axis along two axes, and when the time interval, measured by the measuring system based on the result of detection of the reverse detector, is less than a predetermined value with respect to one axis of the two axes, the controlling system stops the correcting operation with respect to the two axes.

BRIEF DESCRIPTION OF THE DRAWINGS

The object and other objects of the present invention will be better understood from the following description, with reference to the accompanying drawings, in which:

FIG. 5 is a flowchart indicating procedures of a camera controlling sequence, from the time at which a power switch is turned ON to the time at which a photometric switch is turned ON;

FIG. 6 is a flowchart indicating procedures of the camera controlling sequence, from the time at which the photometric switch is turned ON to the time at which a release switch is turned ON;

DESCRIPTION OF THE PREFERRED EMBODIMENTS

An embodiment according to the present invention will be explained with reference to the figures. Note that, in this specification, "a perpendicular plan" means a plan parallel to a surface of a film when a camera is held in such a manner that an optical axis of a photographing optical system is positioned horizontally. Further, "a horizontal axis" means an axis which divides the camera into two parts in the vertical direction, crossing the optical axis of the photographing optical system in the perpendicular plan, and "a vertical axis" means an axis which divides the camera into two parts in a lateral direction.

Figure 1:
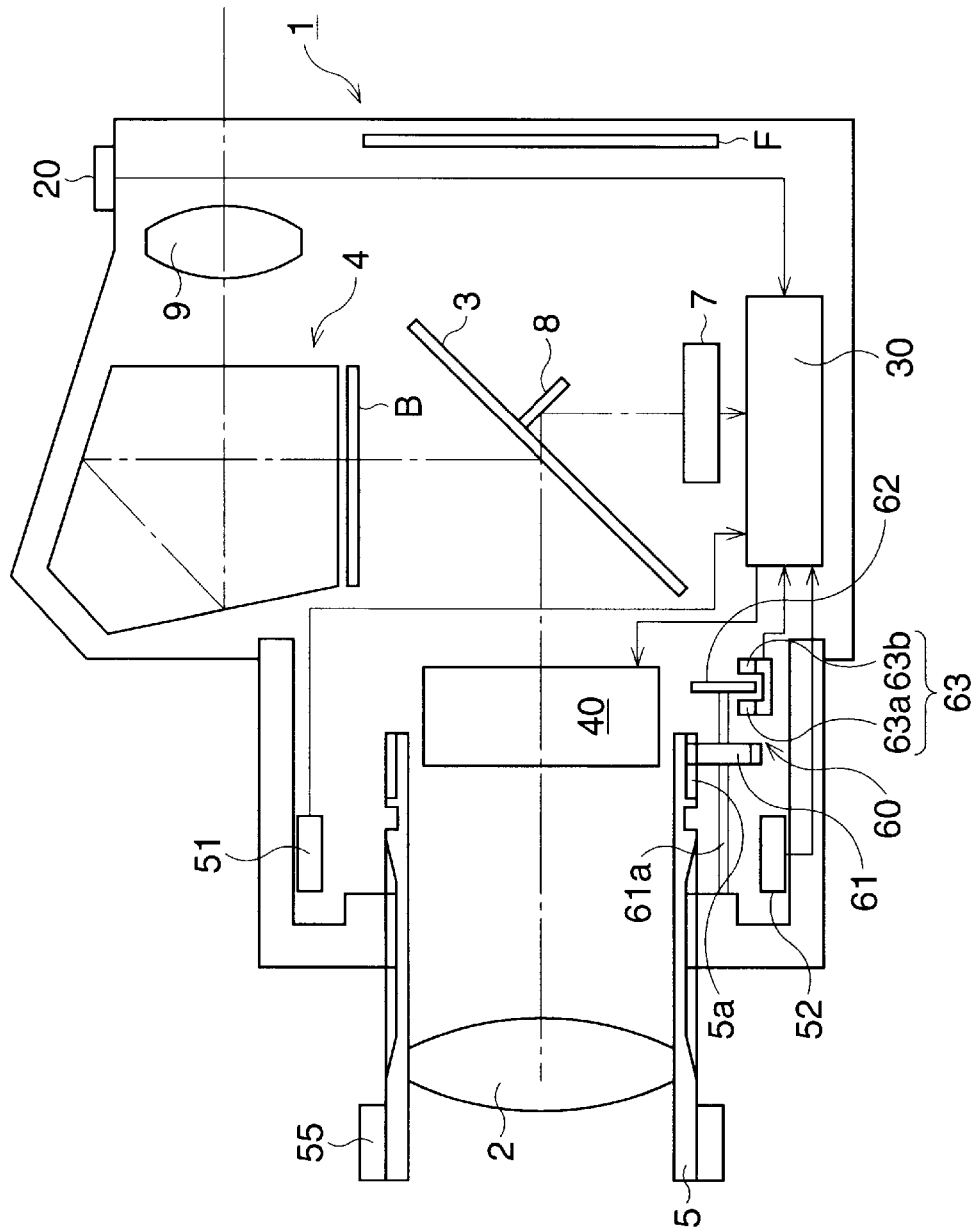
FIG. 1 is a block diagram a camera, including a function of correcting a tremble of a focused image, to which an embodiment, according to the present invention, is applied.

FIG. 1 shows a camera 1, including a correcting function of a focused image to which an embodiment, according to the present invention, is applied. The camera 1 is provided with a group 2 of optical systems which is included in a photographing optical system, a quick return mirror 3, a finder optical system 4, an AF sensor 7, a sub-mirror 8, a shutter button 20, a controlling system 30 and a correcting system 40 of a focused image tremble. An object image is imaged on a surface of a film F, which is an image receiving surface, by the photographing optical system. A luminance reflected by the object is led to an eye of a user, by the finder optical system 4, after passing through the group 2 of optical systems of the photographing optical system and being reflected by the quick return mirror 3. The luminance reflected by the object is also led to the AF sensor 7 after being reflected by the sub-mirror 8. The controlling system 30 wholly controls the camera 1.

Further, the camera 1 is provided with angular speed sensors 51, 52 and a lens movement detector 60. A tremble of the photographing optical system is sensed by the angular speed sensors 51 and 52. The movement of the photographing optical system along the optical axis is detected by the lens movement detector 60.

The shutter button 20 can be pushed by one step to turn a photometry switch to an ON position, and can be pushed by two steps to turn a release switch to an ON position. The information of ON/OFF position of these switches is input into the controlling system 30. Note that, the photometry switch and the release switch are omitted in FIG. 1.

The angular speed sensor 51 is provided for detecting an angular speed of the rotational movement of the camera 1 in a lengthwise direction (the vertical direction). The angular speed sensor 51 outputs a voltage corresponding to the angular speed in the lengthwise direction due to, for example, a hand tremble. The angular speed sensor 52 is provided for detecting an angular speed of the rotational movement of the camera 1 in a direction perpendicular to a sheet of FIG. 1 (horizontal direction). The angular speed sensor 52 outputs a voltage corresponding to the angular speed in the lateral direction due to, for example, the hand tremble.

The correcting system 40 for the focused image tremble is provided with a correcting optical system which is included in the photographing optical system and a driving system to drive the correcting optical system. The correcting optical system is provided for deflecting the optical axis of the photographing optical system. The driving system drives the correcting optical system, in accordance with a controlling signal output from the controlling system 30, so that the movement of the object image formed on the surface of the film F by the photographing optical system can be canceled. The driving system deflects the optical axis of the photographing optical system independently in the perpendicular direction to the sheet of FIG. 1 and the lengthwise direction.

When the movement of the photographing optical system is detected by the lens movement detector 60 and when the photographing is performed, the controlling system 30 corrects the focused image tremble, on the surface of the film F and in a finder view, by driving the correcting optical system 40 based on input signals from the angular speed sensors 51 and 52.

In FIG. 1, the group 2 of the optical systems of the photographing optical system is depicted as a single lens. However, the group 2 practically includes a plurality of lens or lens groups. Some or all of the lenses can be moved along the optical axis of the photographing optical system, for focusing operation and zooming operation. In this embodiment, the lens movement detector 60 detects the movement of a lens group provided for the focusing operation. This lens group is referred to as a "focusing lens". Further, the photographing optical system is composed of the group 2 of the optical systems and the correcting optical system of the tremble correcting system 40. Note that, the group 2 of the optical systems is referred to as "other optical systems" in this specification.

The quick return mirror 3 is set to a down position as shown in FIG. 1, when an object is viewed through the finder optical system 4. A luminance reflected by the object, which is incident on the camera 1 through the photographing optical system including the focusing lens and the correction system 40, is reflected by the quick return mirror 3 to be led to a focusing screen B. The object image on the focusing screen B is inverted by a pentagonal prism included in the finder optical system 4, so that the user views the object image on the focusing screen B as an erected image through an eyepiece lens 9. Namely, in this embodiment, a finder optical system in a broad sense is provided with the photographing optical system including the focusing lens, the correction optical system of the correction system 40, the quick return mirror 3, the focusing screen B, the pentagonal prism and the eyepiece lens 9.

The quick return mirror 3 and a sub-mirror 8 are set to an up position, at which the quick return mirror 3 faces to the focusing screen B, by a mirror driving device (omitted in FIG. 1), when the photographing is carried out. Accordingly, when the photographing is carried out, the luminance reflected by the object is led to the surface of the film F through the photographing optical system (the other optical systems 2 and the correction optical system of the focused image correcting device 40), so that the object image is imaged on the surface of the film F. The object image is recorded on the surface of the film F to be printed.

When a lens barrel 5 is rotated, the focusing lens is moved along the optical axis of the photographing optical system, by a cam mechanism (omitted in FIG. 1) which is well-known. The lens barrel 5 is rotated by a motor mounted on a body of the camera 1 or on a lens unit, or by a user's manual operation of a focusing ring 55.

An AF sensor 7 detects a defocus amount of the photographing optical system by a phase difference detecting method, which is a well-known sensor. An image sensor (omitted in FIG. 1) included in the AF sensor 7 is placed to be optically equivalent to the focusing screen B and the surface of the film F. A focusing condition on the focusing screen B is similar to a focusing condition on the surface of the film F. Accordingly, when the object image is focused on the focusing screen B by the photographing optical system, in other words, when the focal point of the photographing optical system is coincident with the focusing screen B, the object image is focused on the surface of the film F.

The AF sensor 7 detects the focusing condition of the object image on the surface of the film F as the defocus amount. Namely, the AF sensor 7 detects the defocus amount which indicates a direction and distance of a present position of the focal point of the image formed by the photographing optical system, from the focusing screen B and the surface of the film F. The controlling system 30 calculates a driving direction and a driving amount of the focusing lens based on the defocus amount detected by the AF sensor 7. The focusing lens is driven in accordance with a result of the calculation of the controlling system 30, so that an automatic focusing is performed.

The lens movement detector 60 is provided with a pinion gear 61, a slit board 62 and a photo interrupter 63. The pinion gear 61 is engaged with a rack 5a which is formed on an outer surface the lens barrel 5. A shaft 61a is fixedly engaged at a center of pinion gear 61, being perpendicular to the pinion gear 61. The slit board 62 is fixedly supported by one end of the shaft 61a. Another end of the shaft 61a is rotatably received by a hole formed on an inner wall of the body of camera 1. Namely, the slit board 62 is rotated in accordance with a rotational movement of the pinion gear 61. A plurality of slits are radially formed on the slit board 62 around a rotating axis of the slit board 62. The photo interrupter 63 includes a light emitting portion 63a and a light receiving portion 63b. The slit board 62 is placed between the light emitting portion 63a and the light receiving portion 63b. The light receiving portion 63b outputs a signal depending upon whether a light is received. Namely, the signal is periodically output from the light receiving portion 63b in accordance with a rotation of the slit board 62. As described above, the lens barrel 5 is rotated by the motor mounted on the body of the camera 1 or the lens unit in an auto focus mode, and rotated by the user's manual operation in a manual mode. Accordingly, a pulse signal is output from the light receiving portion 63b in accordance with the rotation of the slit board 62 accompanying the rotation of the lens barrel 5 in the focusing operation.

Figure 2:
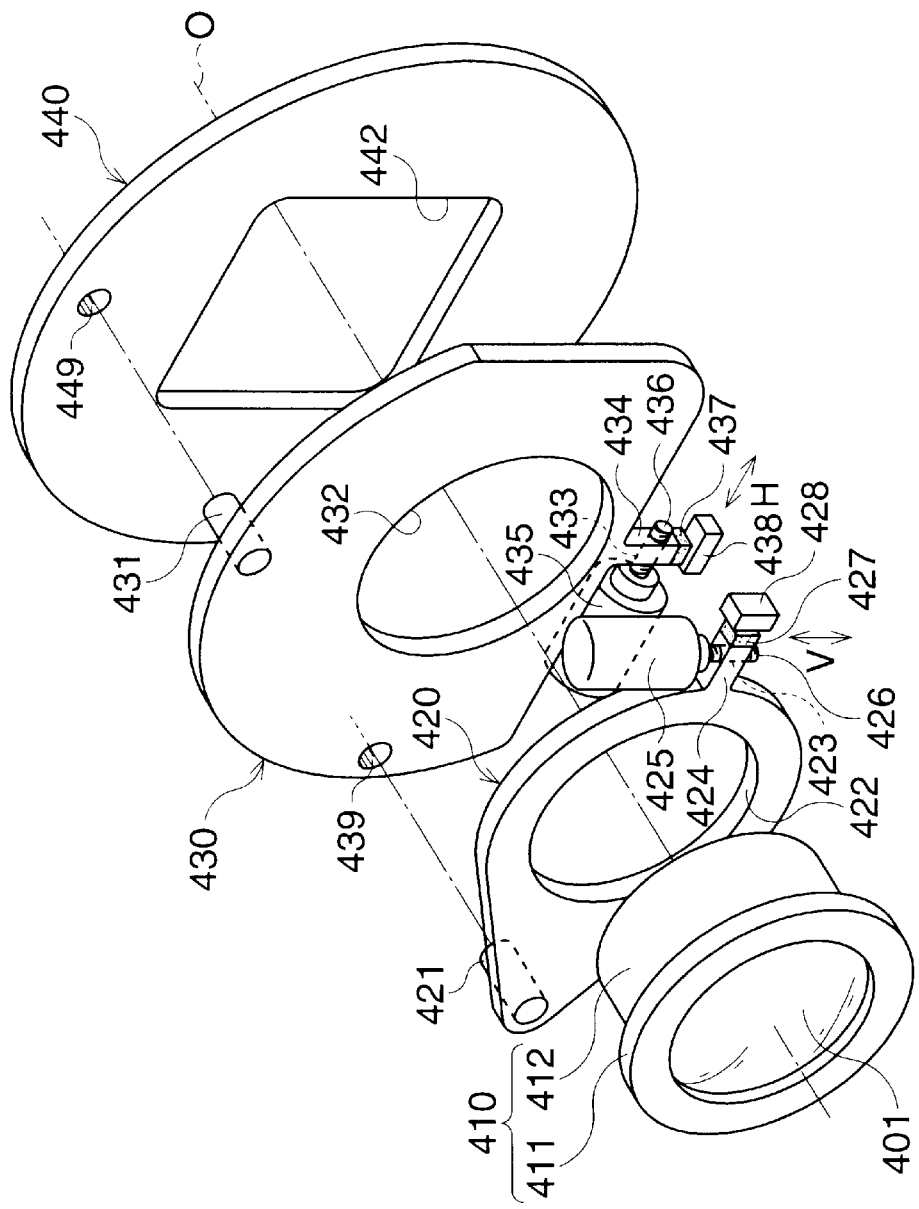
FIG. 2 is a perspective view of a driving device of correcting optical systems of the embodiment.

FIG. 2 is an exploded perspective view of the correcting system 40 of the focused image tremble. A correction lens 401, which is part of the correcting optical system, is fixedly engaged in a lens frame 410. The lens frame 410 is fixed to a first rotating board 420. The first rotating board 420 is rotatably mounted on a second rotating board 430 by a pivot shaft 421. The second rotating board 430 is rotatably mounted on a base board 440 by a pivot shaft 431. The pivot shaft 431 is positioned, being rotated from the pivot shaft 421 by 90 degrees with an optical axis O of the photographing optical system (omitted in FIG. 2) being a rotational center. The base board 440 is fixedly mounted in the camera 1.

Accordingly, the correction lens 401 is held, being movable in directions H and V (indicated by arrows in FIG. 2) in a plan perpendicular to the optical axis O in accordance with the rotational movement of the first and second rotating boards 420, 430.

The lens frame 410 includes a large diameter portion 411 and a small diameter portion 412. The small diameter portion 412 is engaged with an opening portion 422 of the first rotating board 420. The pivot shaft 421 is received by a pivot hole 439 which is formed on the second rotating board 430. An arm 424 is formed at an opposite side to the pivot shaft 421 with the opening portion 422 therebetween. A screw hole 423 is formed in the arm 424.

A screw 426, which is connected to a rotational axis of a motor 425 by a flexible joint, is threadably engaged with the screw hole 423. The motor 425 is fixed on the second rotating board 430. When the motor 425 is driven, the first rotating board 420 is rotatably moved around the pivot shaft 421 in the direction V, in accordance with the rotational movement of the screw 426.

A magnet 427 is mounted on an tip end of the arm 424. An MR (Magnetic Resistance) sensor 428 is mounted on the second rotating board 430, facing to the magnet 427. Positional data of the magnet 427 is detected by the MR sensor 428. The controlling system 30 detects the movement of the correction lens 401 in the direction V by an output signal from the MR sensor 428.

The pivot shaft 431 is received by a pivot hole 449 which is formed on the base board 440. An opening portion 432, by which the small diameter portion 412 is received, is formed on the second rotating board 430. The opening portion 432 is formed in such a manner that, the movement of the small diameter portion 412, in accordance with the rotation of the first rotating board 420, is not prevented, when the first rotating board 420 is mounted on the second rotating board 430.

A driving arm 434 is formed at an opposite side to the pivot shaft 431 with the opening portion 432 therebetween. A screw 436, which is connected to a rotational axis of a motor 435 by a flexible joint, is threadably engaged with the screw hole 433. When the motor 435 is driven, the second rotating board 430 is rotatably moved around the pivot shaft 431 in the direction H, in accordance with the rotational movement of the screw 436.

A magnet 437 is mounted on an tip end of the driving arm 434. An MR sensor 438 is mounted on the base board 440, facing to the magnet 437. Positional data of the magnet 437 is detected by the MR sensor 438. The controlling system 30 detects the movement of the correction lens 401 in the direction H by an output signal from the MR sensor 438.

An opening portion 442, through which the small diameter portion 412 is pierced, is formed on the base board 440. The opening portion 442 is formed in such a manner that the movement of the small diameter portion 412, in accordance with the rotation of the first and second rotating boards 420, 430, is not prevented.

Figure 3:
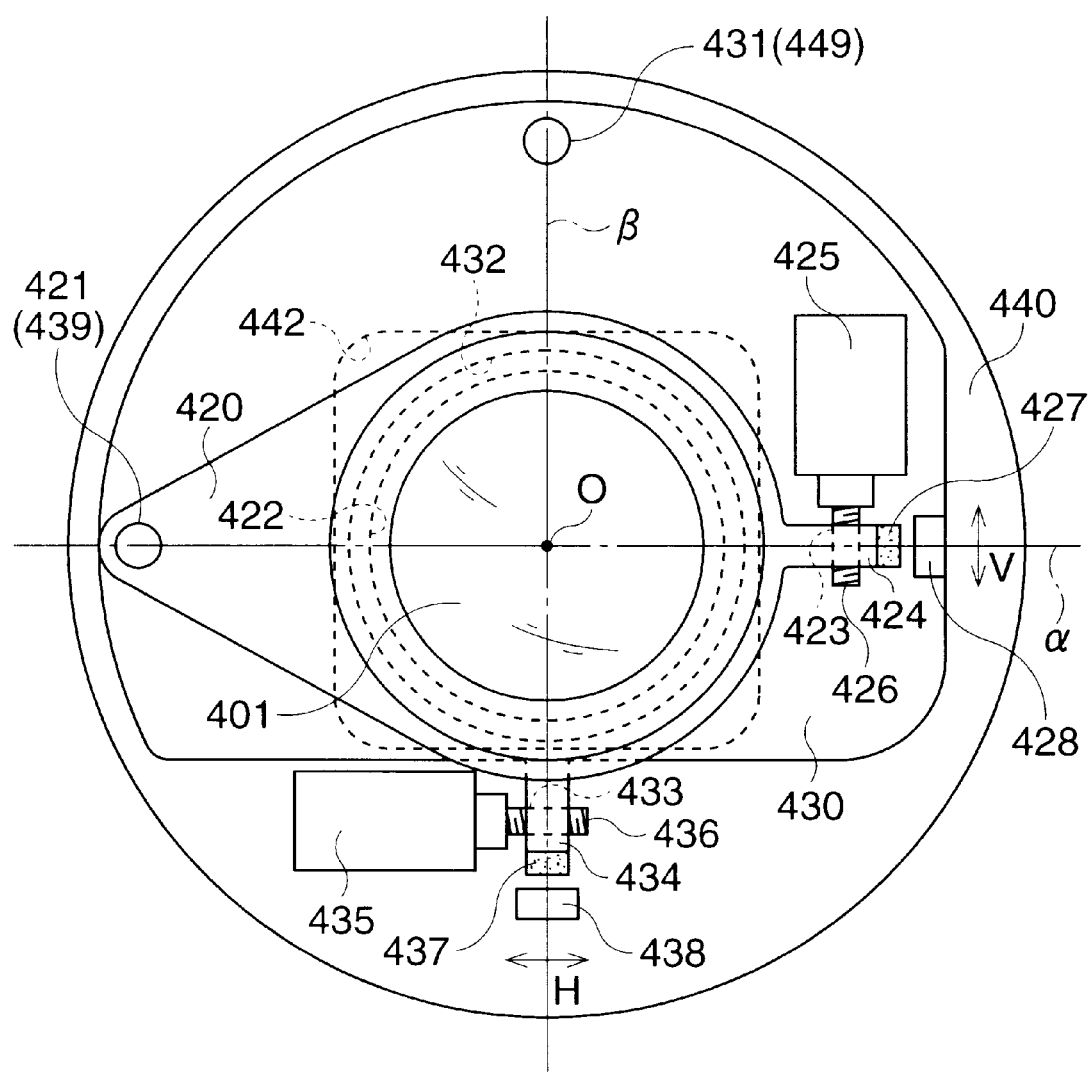
FIG. 3 is a front view of the driving device of FIG. 2, viewed from the side of a photographing optical system.

FIG. 3 is a front view showing the correcting system 40, in which the lens frame 410, the first rotating board 420, the second rotating board 430 and the base board 440 are constructed, depicted from the side of the other optical systems 2 of the photographing optical system. In FIG. 3, an optical axis of the correction lens 401 is coaxial with the optical axis of the other optical systems 2 of the photographing optical system. Namely, in FIG. 3, the optical axis of the correction lens 401 coincides with the optical axis of the other optical systems 2. This situation is referred to as a "standard situation". In the standard situation, the rotational center of the pivot shaft 421 of the first rotating board 420, the optical axis O, the magnet 427 and the MR sensor 428 are positioned on a straight line α. Similarly, in the standard situation, the rotational center of the pivot shaft 431 of the second rotating board 430, the optical axis O, the magnet 437 and the MR sensor 438 are positioned on a straight line β.

Note that, the straight line α corresponds to the above mentioned horizontal axis, and the straight line β corresponds to the above mentioned vertical axis.

Figure 4:
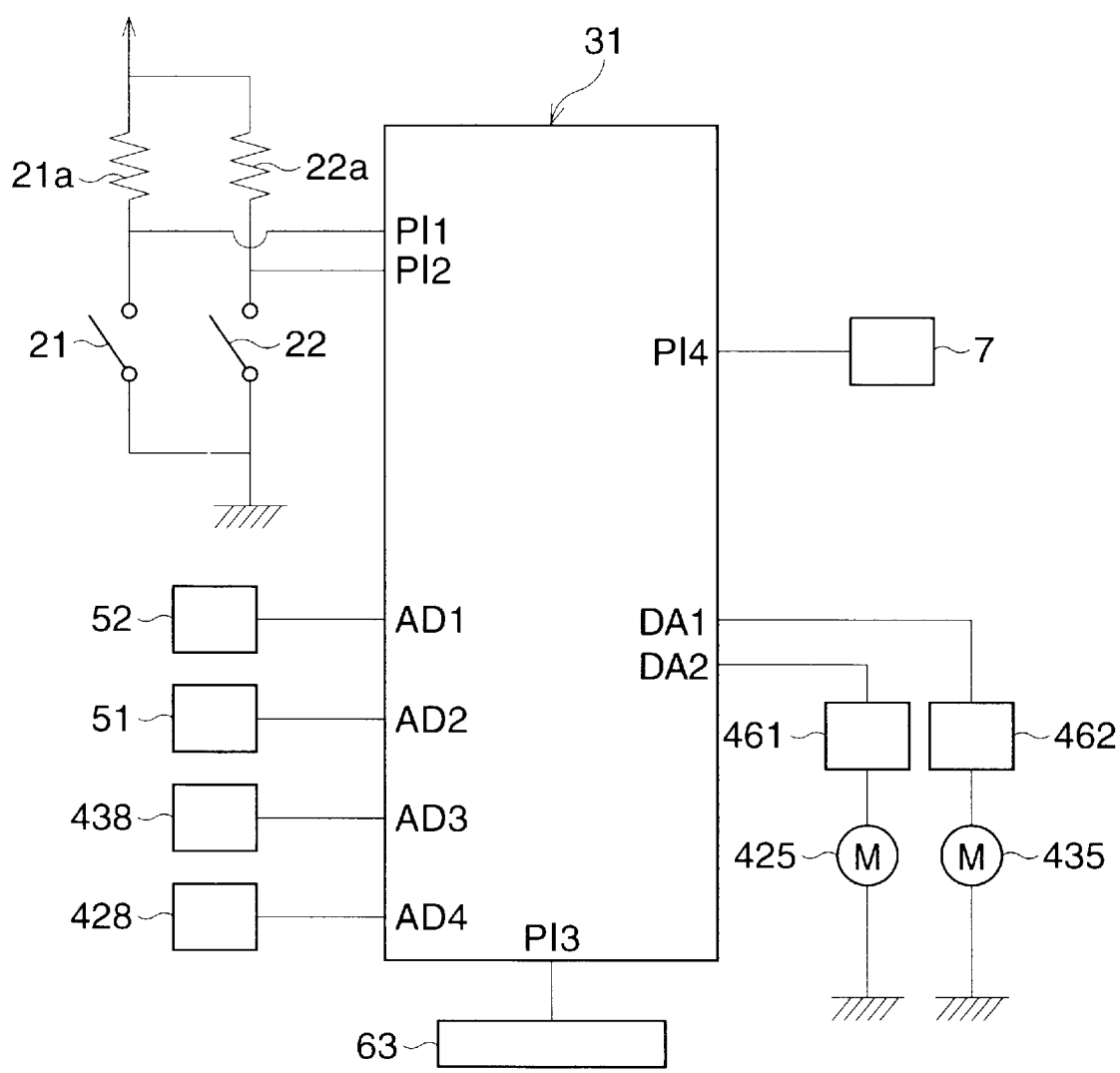
FIG. 4 is a block diagram of a controlling system of the camera of the embodiment.
Figure 5:
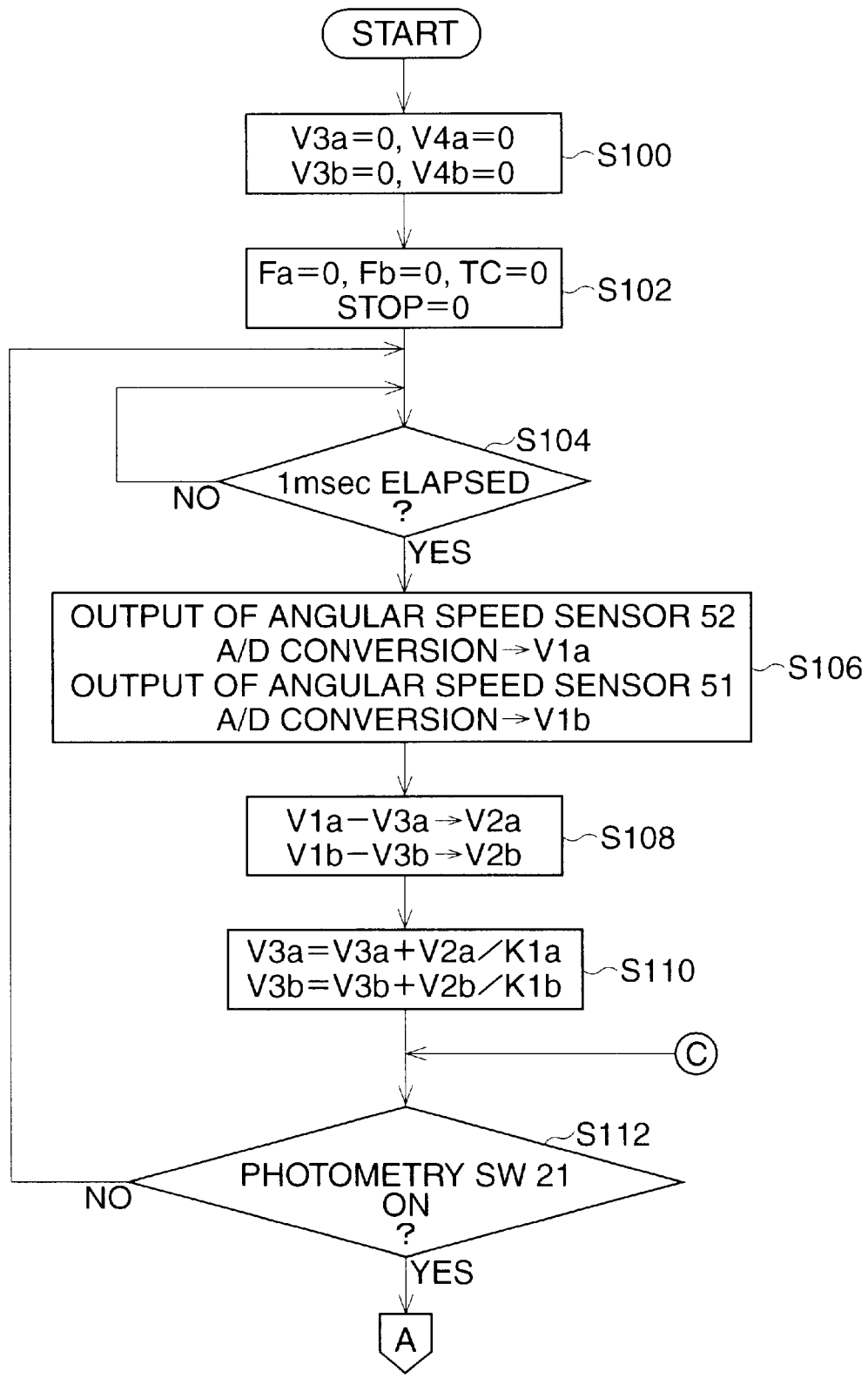

FIG. 4 is a block diagram of the controlling system 30. Input and output signals of a CPU 31 which is provided for the controlling system 30, will be explained with reference to the block diagram. Information of the ON/OFF status of the photometry switch 21, in accordance with the shutter button 20 (see FIG. 1), is input to a port PI1 of the CPU 31, as a digital signal of one bit. Also, information of the ON/OFF status of the release switch 22, in accordance with the shutter button 20, is input to a port PI2 of the CPU 31, as a digital signal of one bit. Voltage output from the angular speed sensor 51 is input to an A/D conversion port AD2, and voltage output from the angular speed sensor 52 is input to an A/D conversion port AD1. Voltage output from the MR sensor 428 is input to an A/D conversion port AD4 of the CPU 31, and voltage output from the MR sensor 438 is input to an A/D conversion port AD3 of the CPU 31.

A motor 435, which drives the second rotating board 430, is connected to a D/A output port DA1, and a motor 425, which drives the first rotating board 420, is connected to a D/A output port DA2. In the CPU 31, moving amounts of the correction lens 401 in the directions H and V, by which the focused image tremble is corrected, are calculated based on the above mentioned input signals, and the moving amounts of the correction lens 401 are respectively converted to the driving amounts of the motors 425 and 435. Then, voltage corresponding to the driving amounts of the motors 435 and 425 is respectively output from the D/A ports DA1 and DA2.

In the CPU 31, an exposure value (Ev) is calculated by performing a photometry operation of a luminance reflected by the object through a photometry device (omitted in FIG. 4), when the ON signal is input to the first input port PI1 after the photometry switch is turned to the ON position by pushing the shutter button 20 by one step. Then, an aperture value (Av) and an exposure time (Tv) are calculated based on the Ev, in the CPU 31.

Further, under the control of the CPU 31, an opening degree of an aperture (omitted in FIGS. 1 and 4) is adjusted based on the Av, the quick return mirror 3 (see FIG. 1) is set to an up position, and then a shutter device (omitted in FIGS. 1 and 4) is driven at a predetermined speed, when the ON signal is input to the second input port PI2 after the release switch is turned to the ON position by pushing the shutter button 20 by two steps.

With reference to flowcharts indicated in FIGS. 5 through 10, an operation in the CPU 31, for correcting the focused image tremble caused by the hand tremble, will be explained.

When a power switch (omitted in FIGS. 1 and 4) is turned to the ON position, in step S100, the CPU 31 carries out an initializing operation, by which a digital variable V3a, a digital rotational displacement value of the vertical axis V4a, a digital variable V3b and a digital rotational displacement value of the horizontal axis V4b are respectively set to "0".

A direct-current component along the horizontal axis based on a null voltage output from the angular speed sensor 52 and a direct-current component along the horizontal axis based on a slow tremble of the camera are stored in the digital variable V3a. Note that, the direct-current component along the horizontal axis based on the null voltage output from the angular speed sensor 52 is an offset value of the detected signal of the hand tremble along the horizontal axis. A direct-current component along the vertical axis based on a null voltage output from the angular speed sensor 51 and a direct-current component along the vertical axis based on the slow tremble of the camera are stored in the digital variable V3b. Note that, the direct-current component along the vertical axis based on the null voltage output from the angular speed sensor 51 is an offset value of the detected signal of the hand tremble along the vertical axis.

In step S102, flags Fa, Fb, STOP and a variable TC are initialized to "0". The flags Fa, Fb and STOP are used in a check routine of a tremble frequency. The check routine will be described later.

The value of the flag Fa indicates a number of performances of the check routine of the tremble frequency along the vertical axis. If the flag Fa is set to "0", it indicates a first time of performing the check routine of the tremble frequency along the vertical axis. If the flag Fa is set to "1", it indicates a second time or more than second time of performing the check routine of the vertical axis.

The value of the flag Fb indicates a number of performances time of the check routine of the tremble frequency along the horizontal axis. If the flag Fb is set to "0", it indicates a first time of performing the check routine of the tremble frequency along the horizontal axis. If the flag Fb is set to "1", it indicates a second time or more than second time of performing the check routine of the horizontal axis.

The value of the flag STOP is used for judging whether the correcting operation of the focused image tremble is performed or not. If the flag STOP is set to "1", it indicates that the correcting operation is not performed.

The variable TC represents a current time. Note that, the variable TC will be explained in detail when the check routine is explained.

Then, in step S104, it is checked whether 1 ms (millisecond) has elapsed after the power switch is turned to the ON position. If 1 ms has passed, the process goes to step S106. Namely, the procedures after step S106 are performed each 1 millisecond.

In step S106, A/D converting operation of the signals which are input into the A/D conversion ports AD1 and AD2 is performed. A hand tremble analog-detected-signal along the horizontal axis α, output from the angular speed sensor 52, is read through the A/D conversion port AD1, and the tremble analog-detected-signal is converted to a digital value, before being set to a digital-detected-variable of the horizontal axis V1$a$. Similarly, a hand tremble analog-detected-signal along the vertical axis β, output from the angular speed sensor 51, is read through the A/D conversion port AD2, and the tremble analog-detected-signal is converted to a digital value, before being set to a digital-detected-variable of the vertical axis V1$b$.

In step S108, an operation which removes influence of the direct-current components is performed. A digital variable V3$a$, which is the direct-current component, is subtracted from the digital-detected-variable V1$a$, so that an angular speed V2$a$ along the horizontal axis is calculated. Also, a digital. variable V3$b$, which is the direct-current component, is subtracted from the digital-detected-variable V1$b$, so that an angular speed V2$b$ along the vertical axis is calculated.

In step S110, the angular speed V2$a$ is divided by a first coefficient K1$a$, before being added to the digital variable V3$a$, so that the digital variable V3$a$ is reset. Similarly, the angular speed V2$b$ is divided by a first coefficient K1$b$, before being added to the digital variable V3$b$, so that the digital variable V3$b$ is reset.

Then, in step S112, it is judged whether the photometry switch 21 is turned to the ON position. Unless the photometry switch 21 is ON, the process returns to step S104. In other words, while the photometry switch is in the OFF position, the procedures from step S104 through step S110 are repeatedly performed (loop performance). Namely, an operation equivalent to a function of a negative-feedback amplifier is performed. In this embodiment, the negative-feedback amplifier includes: a difference amplifier which gives the difference between the digital-detected-value V1$a$ (V1$b$) and the digital variable V3$a$ (V3$b$); and a high-pass filter which outputs the digital variable V3$a$ (V3$b$) used for removing the direct-current component from the angular speed V2$a$(V2$b$)

As described above, the digital variables V3$a$ and V3$b$ are set to "0" at a first time performance, and the values recalculated in step S110 are respectively used for the digital variables V3$a$ and V3$b$ in the loop performance after the first time performance.

There is a situation in which the values of voltage output from the angular speed sensors 51 and 52 are not "0" due to the null voltage that is the direct-current component, even though a hand tremble does not occur. However, the direct-current component included in each values of output voltage from the angular speed sensors 51 and 52 becomes substantially equal to "0" by the above mentioned loop performance equivalent to the negative-feedback amplifier.

Usually, it takes a long time for the direct-current component to become equal to "0", from when the main power switch is turned ON till the photometry switch is turned ON, for example, just after the power switch is turned ON, or after the camera is panned widely in one direction for deciding or changing a composition. Note that, in this embodiment, the first coefficients K1$a$ and K1$b$ are respectively set to relatively small values (smaller than second coefficients K2$a$ and K2$b$ as described below). Accordingly, in the above-mentioned situations, the time required for the direct-current component to become substantially equal to "0", is shortened. Consequently, it is prevented that a snapshot is unable to be taken just after the power switch is turned ON or after the camera is panned widely in one direction.

Figure 6:
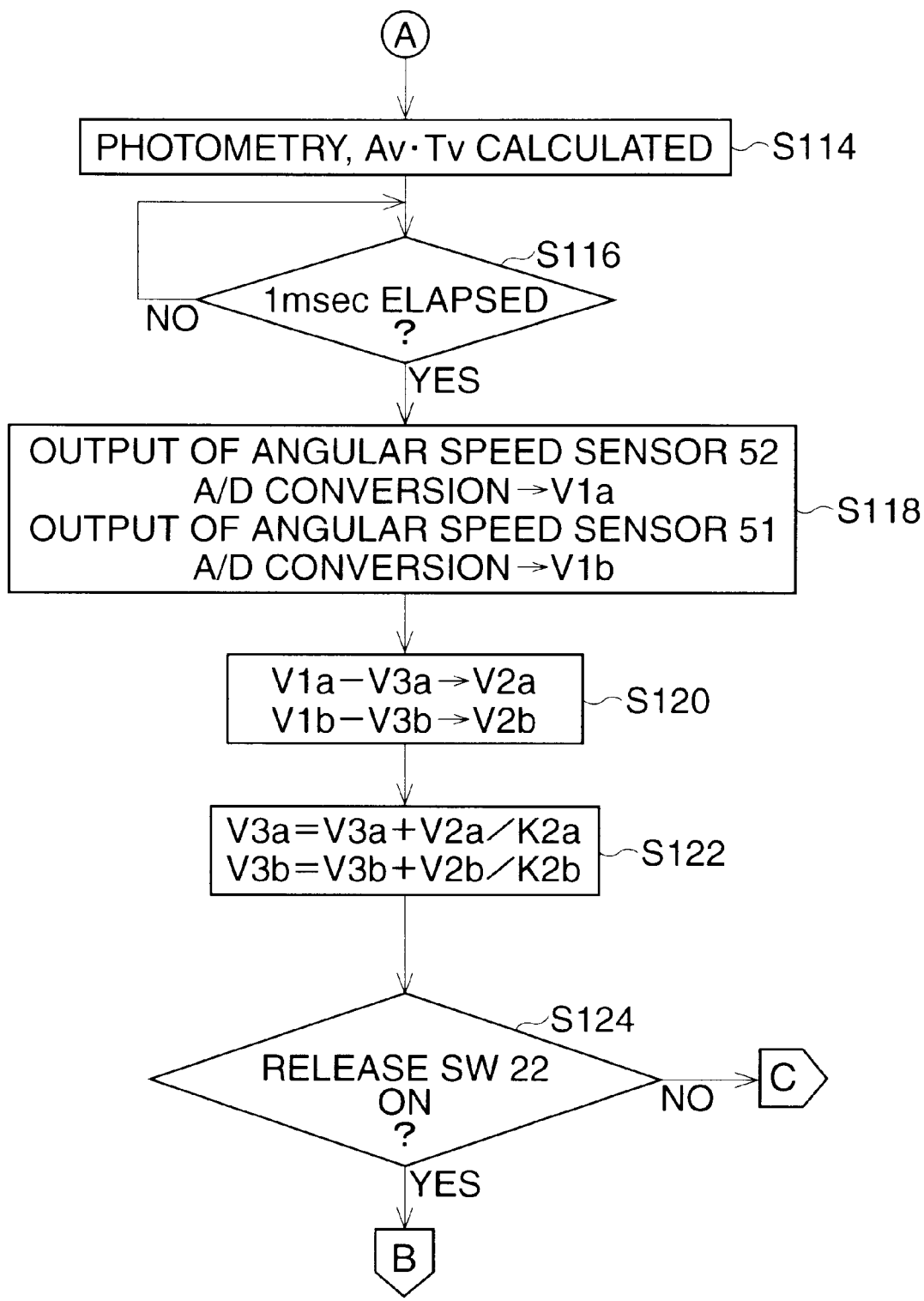

When the photometry switch 21 is turned to the ON position, the process goes to step S114 of FIG. 6. In step S114, the Ev (exposure value) is calculated by performing a photometry operation of the luminance reflected by the object through the photometry device (not shown). Further, the Av and the Tv are calculated based on the Ev.

Subsequently, in step S116, it is checked whether 1 ms has elaplsed. If 1 ms has passed, the process goes to step S118. Namely, the procedures after step S118 are performed each 1 ms. In step S118, the digital-detected-variable of the horizontal axis V1$a$ and the digital-detected-variable of the vertical axis V1$b$ are calculated similarly to the procedure of step S106. Then, the process goes to step S120.

In step S120, an operation similar to the operation of step S108 is performed. The digital variable V3$a$ is subtracted from the digital-detected-variable V1$a$, so that the angular speed V2$a$ along the horizontal axis is calculated. Also, the digital variable V3$b$ is subtracted from the digital-detected-variable V1$b$, so that the angular speed V2$b$ along the vertical axis is calculated.

Then, in step S122, the angular speed V2$a$ is divided by the second coefficient K2$a$, before being added to the digital variable V3$a$, so that the digital variable V3$a$ is reset. Similarly, the angular speed V2$b$ is divided by the second coefficient K2$b$, before being added to the digital variable V3$b$, so that the digital variable V3$b$ is reset. Consequently, the focused image tremble caused by a slow hand tremble is able to be corrected.

Then, in step S124, it is checked whether the release switch 22 is turned to the ON position. Unless the release switch 22 is ON, the process returns to step S112, and the procedures of and after step S112 are repeatedly performed. Namely, the procedures from step S112 through step S122 are repeatedly performed, after the photometry switch 21 is turned to the ON position till the release switch 22 is turned to the ON position. When it is confirmed in step S124 that the release switch 22 is turned ON, the process goes to step S126 of FIG. 7. Note that, the procedures from step S104 through step S110 are repeatedly performed, if the photometry switch 21 is turned to the OFF position before the release switch 22 is turned to the ON position.

Values which have been calculated and stored in the digital variables V3$a$ and V3$b$ in step S110, are used as variables of V3$a$ and V3$b$, at the first time performance of the procedure of steps S120 and S122. Namely, the direct-current component of the null voltage and so on has been removed from each voltage output from the angular speed sensors 51 and 52. On the other hand, in this embodiment, the second coefficients K2$a$ and K2$b$ are respectively set to relatively large values (respectively larger than the first coefficients K2$a$ and K2$b$). Accordingly, in the above mentioned high-pass filters, low frequency band is respectively included in each pass band of the digital-detected values V1$a$ and V1$b$, with respect to filtering of the digital-detected values V1$a$ and V1$b$.

As described above, in step S120, the angular speed value V2$a$, from which the direct-current component, due to the null voltage, is removed, is calculated by subtracting the digital variable V3$a$ from the digital-detected values V1$a$, and similarly, the angular speed value V2$b$, from which the direct-current component, due to the null voltage, is removed, is calculated by subtracting the digital variable V3$b$ from the digital-detected values V1$b$. Accordingly, the angular speed value V2$a$ (V2$b$) accurately corresponds to the real output of the angular speed sensor 52 (51), including the hand tremble of high frequency and the hand tremble of low speed. Namely, the angular speed values V2$a$ and V2$b$ accurately represent the directions and the amounts of the hand tremble.

Figure 7:
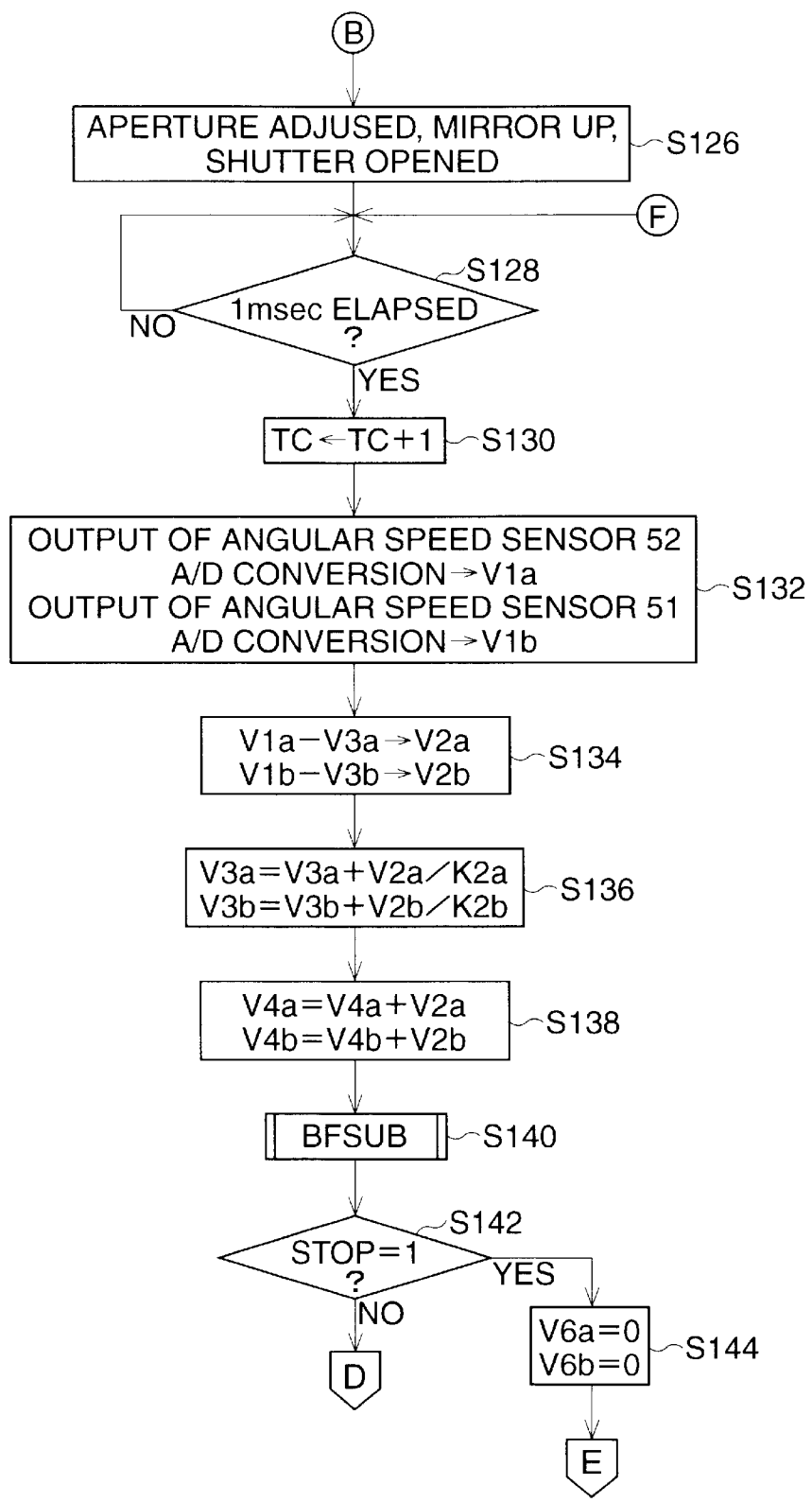
FIG. 7 is a flowchart indicating a first half of procedures for correcting the focused image tremble.

When the release switch is turned to the ON position, the process goes to step S126 of flowchart of FIG. 7, in which the opening degree of the aperture (not shown) is set based on the Av, the quick return mirror 3 is set to the up position, and the shutter device (not shown) is driven to be opened at the predetermined speed.

Then, in step S128, it is checked whether one millisecond has elapsed. If one millisecond has passed, the process goes to step S130. Namely, the procedures of and after step S130 are repeatedly performed at intervals of a millisecond. In the procedures of and after step S130, the correction of the focused image tremble is carried out.

In step S130, the TC is increased by one. Namely, an elapsed time, from when the release switch is turned to the ON position, is stored in the TC each millisecond.

In step S132, similarly to step S106, the digital-detected-value of the horizontal axis V1$a$ and the digital-detected-value of the vertical axis V1$b$ are calculated. Subsequently, in step S134, similarly to steps S108 and S120, the digital variable V3$a$ representing the direct-current component is subtracted from the digital-detected-value V1$a$, and the digital variable V3$b$ representing the direct-current component is subtracted from the digital-detected-value V1$b$.

Then, in step S136, the angular speed V2$a$ is divided by the second coefficient K2$a$, before being added to the digital variable V3$a$, so that the digital variable V3$a$ is reset. Similarly, the angular speed V2$b$ is divided by the second coefficient K2$b$, before being added to the digital variable V3$b$, so that the digital variable V3$b$ is reset. Accordingly, the focused image tremble caused by the slow hand tremble is able to be corrected, as described above.

In step S138, a digital-rotational-displacement-value V4$a$, which defines the rotational displacement of the second rotating board 430 along the horizontal axis α, is calculated by integrating the angular speed of the horizontal axis V2$a$. Also, a digital-rotational-displacement-value V4$b$, which defines the rotational displacement of the first rotating board 420 along the vertical axis β, is calculated by integrating the angular speed of the vertical axis V2$b$.

Note that, in step S138, values, directly calculated by the integration of the angular speeds V2$a$ and V2$b$, are respectively changed to the amounts of the focused image tremble on the image formation surface, to be set to the V4$a$ and the V4$b$, reversing each direction component included in the angular speeds V2$a$ and V2$b$ (namely, the directions of the focused image tremble along the horizontal and vertical axes). Accordingly, the V4$a$ and V4$b$ calculated in step S138 have a function of correction of the focused image tremble on the image formation surface.

After the V4$a$ and the V4$b$ are calculated, the process goes to step S140, in which a tremble frequency check routine (BFSUB routine) is carried out.

Figure 11:
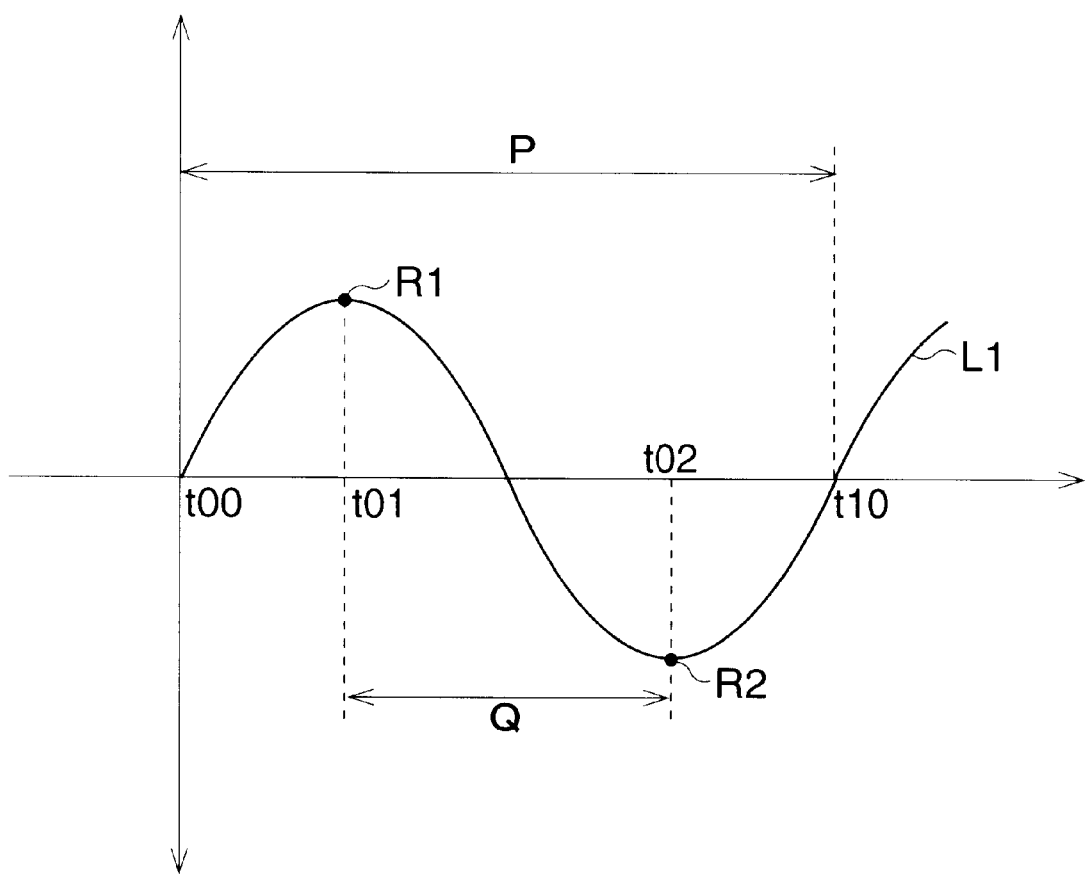
FIG. 11 is a graph showing a change of a trembling quantity and a trembling direction of the focused image, corresponding to a general hand trembling.

With reference to FIG. 11, the checking operation of the focused image tremble in this embodiment will be explained. A characteristic curve L1 indicates changes of both amount and direction of the focused image tremble, corresponding to a normal hand tremble. Note that, the curve L1 is shown as a sine curve in order to make the explanation briefer. Values obtained by differentiating the characteristic curve L1 by time, namely the changing ratio of a tremble speed, are "0" at extreme points R1 and R2. The direction of the tremble is reversed at the extreme points R1 and R2. The maximum frequency of the general hand tremble is 20 Hz (hertz). Therefore, one period P is approximately 50 milliseconds, and a total time period Q from the extreme point R1 to the extreme point R2 is approximately 25 milliseconds.

Accordingly, it is judged whether a tremble of the focused image is caused by the hand tremble, by measuring a total time from a previous reverse of the direction of the tremble to a current reverse of the direction of the tremble and checking if the total time period Q is not less than 25 milliseconds. If the total time period Q is not less than 25 milliseconds, there is a high possibility of the tremble being caused by the hand tremble. Also, if the total time is less than 25 milliseconds, there is a high possibility of the tremble not being caused by the hand tremble but other causes.

Further, there is a possibility of a wave of the focused image tremble being slightly disturbed by a noise and so on. Accordingly, in this embodiment, if the total time is less than 25 milliseconds and also an amplitude between the previous extreme point and the current extreme point is larger than a predetermined threshold value, it is judged that the focused image tremble, having a frequency higher than 25 Hz, occurs and that the tremble is generated not by the hand tremble but other causes.

Figure 9:
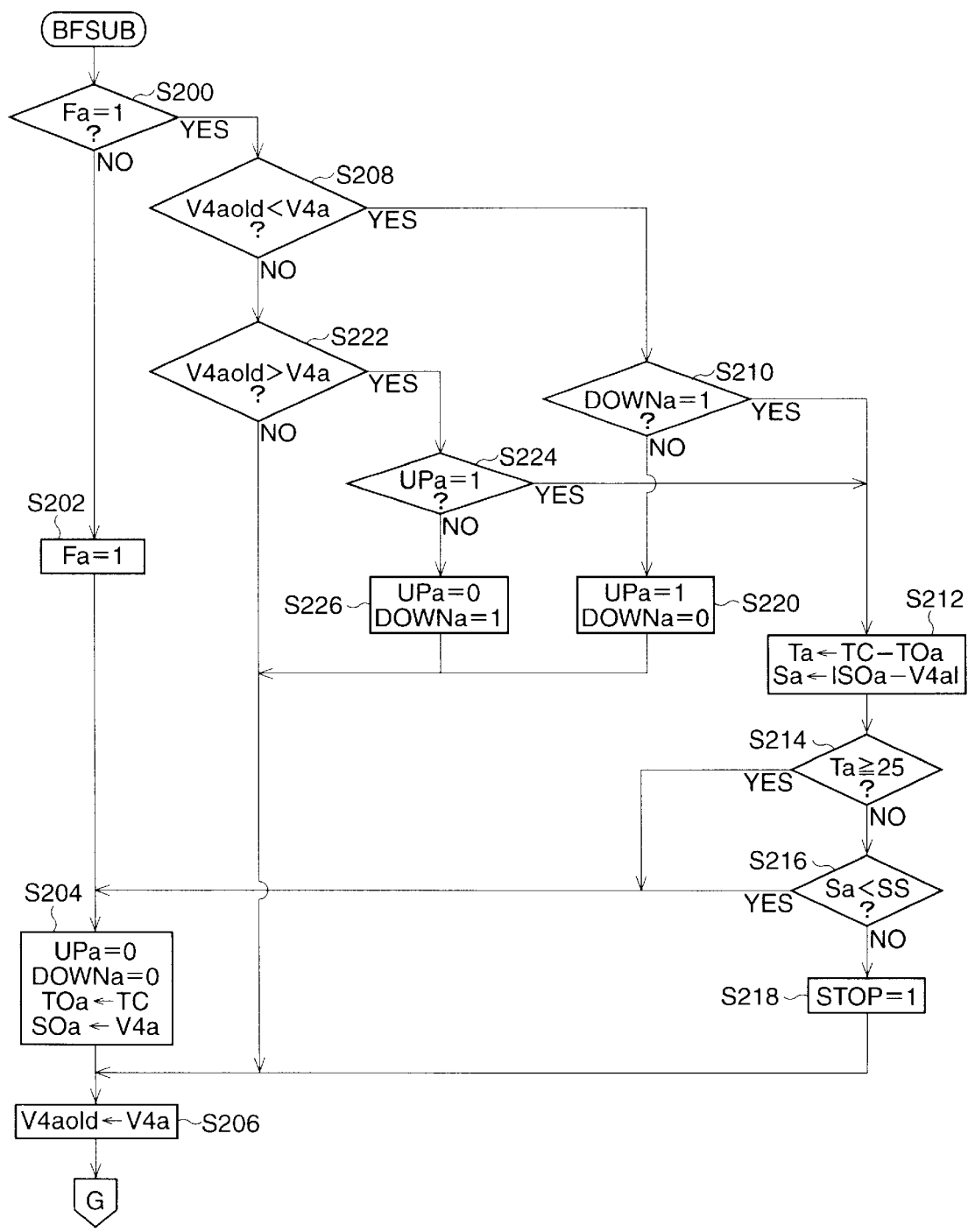
FIG. 9 is a part of a flowchart indicating procedures of a tremble frequency checking routine in FIG. 7 of the focused image tremble, with respect to the horizontal axis.
Figure 10:
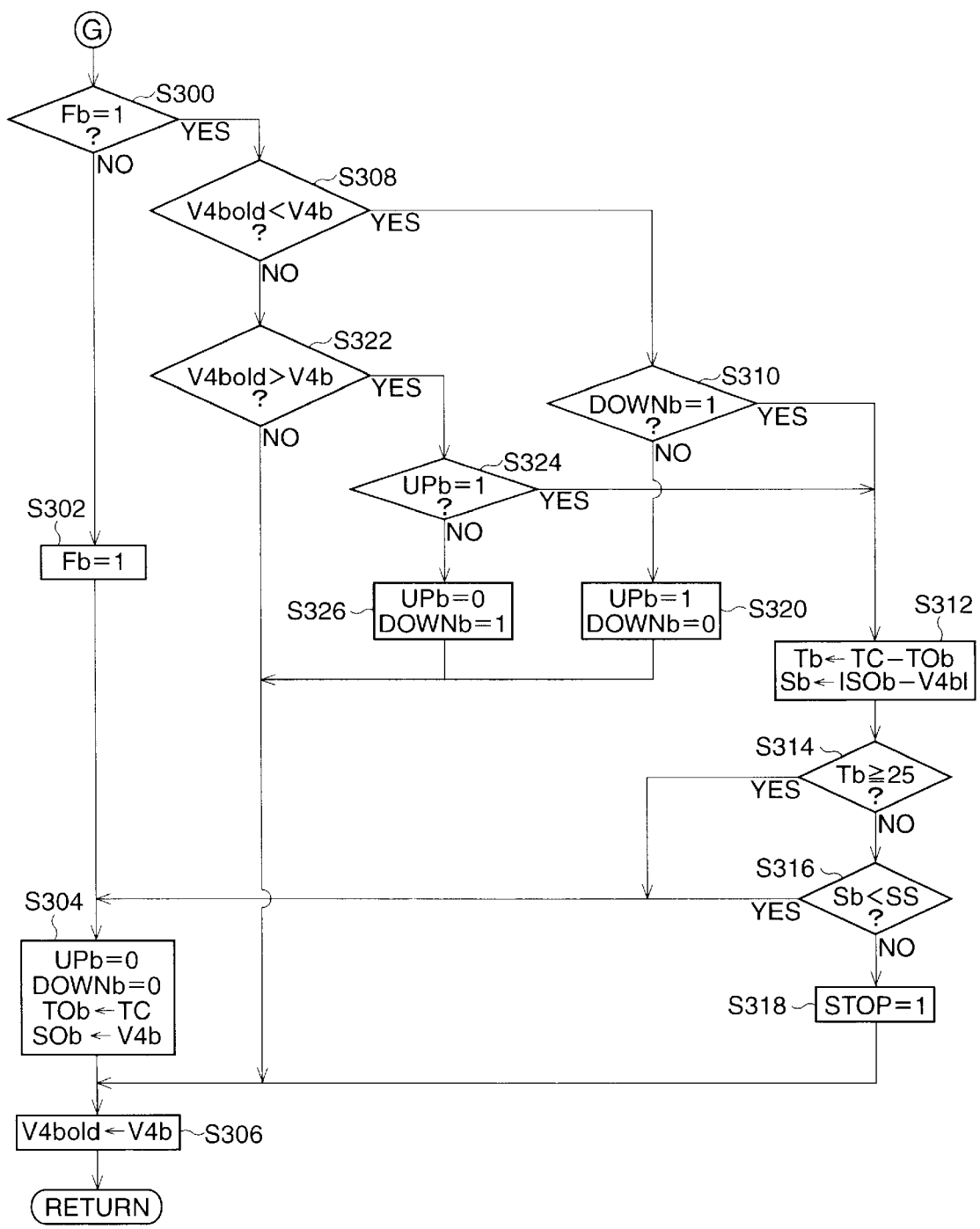
FIG. 10 is the remaining part of the flowchart indicating procedures of the tremble frequency checking routine of the focused image tremble, with respect to the vertical axis.

FIGS. 9 and 10 indicate flowcharts of procedures of the tremble frequency checking routine (BSUB routine). FIG. 9 indicates the procedures of the tremble frequency checking routine with respect to the focused image tremble along the horizontal axis, and FIG. 10 indicates the procedures of the tremble frequency checking routine with respect to the focused image tremble along the vertical axis.

In step S200 of FIG. 9, the value of the flag Fa is checked, whereby it is judged whether the performance of the routine of FIG. 9 is the first time or after the first time. As described above, in the initializing of step S102 of FIG. 5, the flag Fa has already been set to "0". Accordingly, if the value of the flag Fa is "0", it is judged that the current performance of this routine is the first time and the process goes to step S202. In step S202, the flag Fa is set to "1" in order to prepare for the next time performance of this routine.

Subsequently, flags and variables used in this routine are set to some values. A flag UPa is set to "1", when the focused image tremble is directed in a first direction along the horizontal axis α. A flag DOWNa is set to "1", when the focused image tremble is directed in a second direction, opposite to the first direction, along the horizontal axis α. A time, at which the direction of the focused image tremble is reversed previously, is stored in a start time TOa. The digital-rotational-displacement-value is stored in a previous tremble amount SOa when the direction of the focused image tremble is reversed previously.

When the process goes to step S204 from step S202, at which the above mentioned flags and variables are initialized. The flags UPa and DOWNa are respectively set to "0". The start time TOa and the previous tremble amount SOa are respectively set to the value of TC and the value of the digital rotational-displacement-value V4a, of the first time performance of this routine.

After the initialization is performed in step S204, the process goes to step S206. In step S206, the current value of the V4a is stored in a previous-rotational-displacement-value V4old, and then the process goes to step S300 of FIG. 10. The V4old is a variable in which the digital-rotational-displacement-value along the horizontal axis is stored from the previous performance of this routine.

As described above, the flag Fa is set to "1" in step S202, so that it is judged that the performance is after the first time when this routine is performed again. Accordingly, after the first performance, the process always go from step S200 to step S208.

In step S208, it is checked whether the value of the V4aold is less than the value of the V4a. When the value of the V4aold is less than the value of the V4a, it means that the rotational-displacement-value along the horizontal axis is increasing and the focused image tremble is being successively directed in one direction. When the value of the V4aold is larger than the value of the V4a, it means that the rotational-displacement-value along the horizontal axis is decreasing and the focused image tremble is being directed in another direction. In this embodiment, the above mentioned first direction is a direction in which the focused image tremble is directed while the rotational-displacement-value along the horizontal axis is increasing and the flag UPa is set to "1". Further, the above mentioned second direction is a direction in which the focused image tremble is directed while the rotational-displacement-value along the horizontal axis is decreasing and the flag DOWNa is set to "1".

In step S208, if it is confirmed that the value of V4aold is less than the value of the V4a and the focused image tremble is directed in the first direction, the process goes to step S210, in which it is checked whether the value of the flag DOWNa is "1". As described above, when the rotational-displacement-value is decreasing, the flag DOWNa is set to "1". Namely, if the value of the flag DOWNa is "1", it indicates that: the rotational-displacement-value along the horizontal axis was decreasing at the previous performance of this routine; the rotational-displacement-value along the horizontal axis is increased at the present performance of this routine; and the direction of the focused image tremble is reversed from the second direction to the first direction. If the value of the flag DOWNa is not "1", it indicates that: the rotational-displacement-value along the horizontal axis is increasing and the focused image tremble is being successively directed in the first direction. When it is confirmed that the flag DOWNa is set to "1", the process goes to step S212.

When it is confirmed in step S210 that the value of the flag DOWNa is not "1", the process goes to step S220. When the value of the flag DOWNa is not "1" in step S210, it indicates that the rotational-displacement-value is increasing and the focused image tremble is being successively directed in the first direction. Accordingly, in step S220, the flag UPa is set to "1", the flag DOWNa is set to "0", and the process goes to step S206.

On the other hand, when it is confirmed in step S208 that the value of the V4a is not larger than the value of the V4aold, the process goes to step S222, in which it is checked whether the value of V4aold is larger than the value of the V4a.

If it is confirmed in step S222 that the value of the V4aold is larger than the value of the V4a and the rotational-displacement-value is decreasing and the focused image tremble is being directed in the second direction, the process goes to step S224. In step S224, it is checked whether the value of the flag UPa is "1". As described above, when the direction of the focused image tremble is the first direction, the flag UPa is set to "1". Namely, when the value of the flag UPa is "1" in step S224, it indicates that: the rotational-displacement-value along the horizontal axis was increasing at the previous performance of this routine; the rotational-displacement-value is decreased at the present performance of this routine; and the direction of the focused image tremble is reversed from the first direction to the second direction. Further, when the value of the flag UPa is not 1 in step S224, it indicates that the rotational-displacement-value is decreasing and the focused image tremble is successively directed in the second direction. If the value of the flag UPa is "1", the process goes to step S212.

If it is confirmed in step S224 that the value of the flag UPa is not "1", the process goes to step S226. When the value of the flag UPa is not "1" in step S226, it indicates that the focused image tremble is successively directed in the. second direction. Accordingly, in step S226, the flag UPa is set to "0", the flag DOWNa is set to "1", and the process goes to step S206.

When the value of the V4aold is not larger than the value of the V4 in step S222, it indicates that both the values are equal. Accordingly, the process goes to step S206 without resetting the flags UPa and DOWNa.

On the other hand, as described above, when it is confirmed in steps S210 and S224 that the direction of the focused image tremble is reversed, the process goes to step S212. In step S212, the start time TOa is subtracted from the present time TC to be stored in an elapse time period Ta. Namely, a time interval, from the time at which the direction of the focused image tremble was reversed previously to the time at which the direction of the focused image tremble is reversed currently, is stored in the elapse time period Ta. Further, an absolute value of the difference between the previous tremble amount SOa and the V4a is stored in a difference amount Sa.

Then, in step S214, it is checked whether the value of the elapse time period Ta is equal to or larger than "25". When the elapse time period is larger than "25", it indicates that the direction of the focused image tremble is reversed again more than 25 milliseconds after the direction was reversed previously, namely it indicates that the frequency of the focused image tremble is equal or less than 20 Hz. When the elapse time period Ta is less than "25", it indicates that the direction of the focused image tremble is reversed again less than 25 milliseconds after the direction was reversed previously, namely it indicates that there is a possibility of the frequency of the focused image tremble being larger than 20 Hz. If the elapse time period Ta is less than "25", the process goes to step S216.

In step 216, it is checked whether the difference amount Sa is less than a threshold value SS. Considering that there is a case in which the value of the rotational-displacement-value is disturbed by the noise component due to the direct-current component, the threshold value SS is set to a value larger than the noise component. If the difference amount Sa is larger than the threshold value SS, it indicates that the reverse of the direction of the focused image tremble is due to other causes than the noise. If the difference amount Sa is less than the threshold value SS, it indicates that the reverse of the direction of the focused image tremble is due to a disturbance of the rotational-displacement-value caused by the noise. If the difference amount Sa is larger than the threshold SS, the process goes to step S218.

When the process goes to step S218, it indicates that the reverse of the direction of the focused image tremble is not caused by the noise and also the frequency of the focused image tremble is higher than 20 Hz. Accordingly, it is judged that hand tremble, which is unable to be corrected, is occurring. Further, the flag STOP is set to "1", and then the process goes to step S206.

On the other hand, if it is confirmed in step S214 that the elapse time period Ta is equal to or more than 25 ms, the focused image tremble is caused by hand tremble, which is able to be corrected. Accordingly, the value of the flag STOP is not changed, and then the process goes to step S204, in which the flags and the variables are initialized before the next performance of this routine.

When it is judged in step S216 that the difference amount Sa is less than the threshold SS even if it is judged in step S214 that the elapse time period Ta is less than 25 ms, it is judged that the reverse of the direction of the focused image tremble is caused by the disturbance of the rotational-displacement-value due to the noise. Accordingly, the value of the flag STOP is not changed, and then the process goes to step S204, in which the flags and the variables are initialized before the next performance of this routine.

Note that, this routine proceeds on the premise that the camera 1 is still and the focused image tremble does not occur at the beginning of this routine, based on a general using condition of the camera 1. At the first performance of this routine, the flags UPa and DOWNa, which indicate the direction of the focused image tremble, are initialized, the present time TC is stored in the start time T0a, and the rotational-displacement-value is stored in the S0a (step S204). Subsequently, the flags UPa and DOWNa are set each time this routine is repeatedly performed (steps S220, S226). If the reverse of the direction of the focused image tremble is detected for the first time (steps S210 or S224), the elapse time period Ta is calculated based on the present time TC of that moment and the start time T0a, and the absolute value of the difference between the rotational-displacement-value V4a of that time and the S0a.

Namely, when the reverse of the direction of the focused image tremble is detected for the first time, the time at which this routine was performed first and the rotational-displacement-value of that time are compared in step S212, and it is judged, based on the comparison, whether the focused image tremble is due to the hand tremble.

Further, if the reverse of the direction of the focused image tremble is detected during the performance of this routine after the first time reverse was detected, it is checked that the elapse time from the reverse was previously detected and the difference respectively meet predetermined conditions, before judging whether the correction of the focused image tremble is carried out.

On the other hand, in practice, there is a possibility of this routine being performed in a situation that the focused image tremble has already begun when this routine starts, as the camera 1 was trembled when the camera 1 was powered ON. Under this situation, this routine is performed between the previous reverse of the direction of the focused image tremble and the next reverse of the direction. Accordingly, after the first performance of this routine, the reverse of the direction of the focused image tremble is detected for the first time, the elapse time period Ta and the difference amount Sa, calculated in step S212, are respectively smaller, compared with the situation in which the camera is still when this routine starts.

Accordingly, after checking the condition of step S214, the process goes to step S216, and after checking the condition of step S216, the process goes to step S204, in which the above mentioned initialization is performed. Therefore, the elapse time period Ta and the difference amount Sa are accurately calculated in step S212 when the reverse is detected when this routine is repeatedly performed thereafter. In other words, the accuracy of calculating the elapse time period Ta and the difference amount Sa is heightened, by setting the conditions of steps S214 and S216.

As described above, after checking if the reverse of the direction of the focused image tremble exists and performing the procedures corresponding to each case, the rotational-displacement-value V4a of the present time along the horizontal axis $\alpha$ a is stored in the previous-rotational-displacement-value V4aold for the next performance of this routine.

Then, the checking routine of the frequency of the focused image tremble along the horizontal axis $\alpha$ is ended. Subsequently, the process goes to step S300 of FIG. 10, in which a checking routine of the frequency of the focused image tremble along the vertical axis $\beta$ is started. This routine is carried out similarly to the above mentioned checking routine of the focused image along the horizontal axis $\alpha$.

It is confirmed whether the performance of this routine is the first time or not, by checking the value of a flag Fb (step S300). The checking operation of the frequency of the focused image tremble along the vertical axis $\beta$ is carried out by using flags UPb, DOWNb, and variables T0b, S0b. The flags UPb and DOWNb respectively indicate the direction of the focused image tremble along the vertical axis $\beta$. A time, at which the direction of the focused image tremble along the vertical axis $\beta$ is previously reversed, is stored in the starting time T0b. The rotational-displacement-value along the vertical axis $\beta$ at the time which the direction is previously reversed, is stored in the tremble amount S0b.

A rotational-displacement-value along the vertical axis V4b, in which the present value is stored, and a previous-rotational-displacement-value V4bold, in which the previous value was stored, are compared (steps S308, S322). It is judged (steps S310, S324) whether the direction of the focused image tremble along the vertical axis $\beta$ is directed in a same direction or is reversed, by checking both the result of the above mentioned comparison and the direction of the focused image tremble along the vertical axis $\beta$ detected in a previous performance of this routine.

When the direction is reversed, and this routine is performed at the present time less than 25 milliseconds after this routine was performed previously (judged NO in step S314), and an amplitude Sb is equal to or more than the threshold SS (judged NO in step S316), then it is judged that the frequency of the focused image tremble along the vertical axis β is higher than 20 Hz. Then, the correction-stop-flag STOP is set to "1" (S318). This routine is ended, after the V4b of the present time is stored in the V4bold (step S308) for the next performance of this routine.

The process returns to step S140 of FIG. 7, after the checking routines along the horizontal and vertical axes are ended. Subsequently, in step S142, the value of the correction-stop-flag STOP is checked. If the value of the STOP is not "1", the process goes to step S146 of FIG. 8. If the value is "1", the process goes to step S144.

In step S146, an analog signal detected by the MR sensor 438 is read from the A/D conversion port AD3. The analog signal detected by the MR sensor 438 corresponds to a present position of the second rotating board 430. The analog signal of the MR sensor 438 is converted to a digital value, before being stored in a digital-present-position-value along the horizontal axis V5a. Also, an analog signal detected by the MR sensor 428 is read from the A/D conversion port AD4. The analog signal detected by the MR sensor 428 corresponds to a present position of the first rotating board 420. The analog signal of the MR sensor 428 is converted to a digital value, before being stored in a digital-present-position-value along the vertical axis V5b.

In step S148, it is checked whether the absolute value of the rotational-displacement-value V4a of the second rotating board 430 exceeds a MAXa. The MAXa is a maximum quantity of the rotational-displacement-value of the second rotating board 430 along the horizontal axis, defined by a mechanical structure of the correcting system 40. Namely, when the absolute value of the V4a does not exceed the MAXa, it indicates that the focused image tremble, which is able to be corrected by the correcting system 40, occurs, with respect to the horizontal axis. If the absolute value of the V4a does not exceed the MAXa, the process goes to step S150.

In step S150, it is checked whether the absolute value of the rotational-displacement-value V4b of the first rotating board 420 exceeds a MAXb. The MAXb is a maximum quantity of the rotational-displacement-value of the first rotating board 420 along the vertical axis, defined by the mechanical structure of the correcting system 40. Namely, when the absolute value of the V4b does not exceed the MAXb, it indicates that the focused image tremble, which is able to be corrected by the correcting system 40, occurs, with respect to the vertical axis. If the absolute value of the V4b does not exceed the MAXb, the process goes to step S152.

In step S152, a digital-driving-value along the horizontal axis V6a is calculated by subtracting the digital-present-position-value along the horizontal axis V5a from the V4a. The V6a is a driving value of the second rotating board 430 from the present position along the horizontal axis. Namely, the V6a corresponds to a driving amount of the motor 435. Also, a digital-driving-value along the vertical axis V6b is calculated by subtracting the digital-present-position-value along the vertical axis V5b from the V4b. The V6b is a driving value of the first rotating board 420 from the present position along the vertical axis. Namely, the V6b corresponds to a driving amount of the motor 425.

Subsequently, in step S154, the digital-driving-value along the horizontal axis V6a is converted to an analog driving signal, before outputting the analog driving signal from the first D/A conversion port DA1. Also, the digital-driving-value along the vertical axis V6b is converted to an analog driving signal, before outputting the analog driving signal from the second D/A conversion port DA2.

The analog driving signal (corresponding to the V6a), output from the first D/A conversion port DA1, is output to the motor 435, after being amplified by the motor driving circuit 462. The motor 435 drives the second rotating board 430 based on the analog driving signal. Accordingly, the correction lens 401 is driven along the horizontal axis α so that the horizontal axis component of the focused image tremble due to the hand tremble can be canceled.

The analog driving signal (corresponding to the V6b), output from the second D/A conversion port DA2, is output to the motor 425, after being amplified by the motor driving circuit 461. The motor 425 drives the first rotating board 420 based on the analog driving signal. Accordingly, the correction lens 401 is driven along the vertical axis β so that the vertical axis component of the focused image tremble due to the hand tremble can be canceled.

Figure 8:
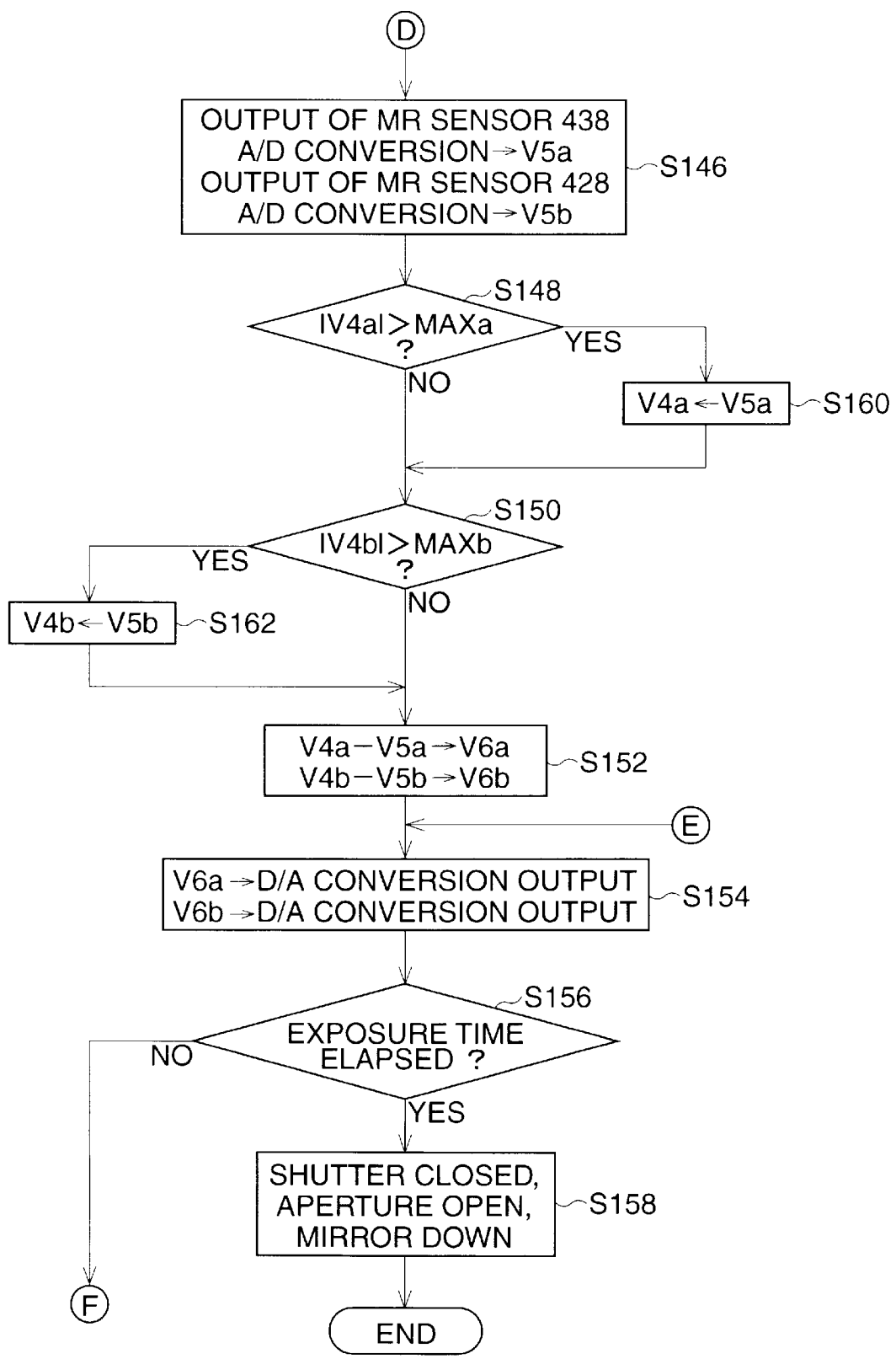
FIG. 8 is a flowchart indicating a latter half of the procedures for correcting the focused image tremble and an ending routine of the camera controlling sequence.

On the other hand, when the process goes to step S144 after it is confirmed that the value of the flag STOP is "1", the values V6a and V6 are respectively set to "0", before the process jumps to step S154 of FIG. 8. Namely, the output signals from the first and second D/A conversion ports DA1, DA2 are forced to be set to "0". Accordingly, the first and second rotating boards 420, 430 are not driven, so that the correction of the focused image tremble is stopped.

In step S156, it is judged whether the exposure time, calculated in step S114, has elapsed, after the analog driving signals (V6a, V6b) are output from the first and second D/A conversion ports DA1, DA2 in step S154. If the exposure time has not yet elapsed, the process returns to step S128 and the procedures thereafter are repeated, so that the driving control of the first and second motors 435, 425 is carried out for correcting the focused image tremble. On the other hand, if it is judged that the exposure time has elapsed, the process goes to step S158. In step S158, the shutter device (not shown) is closed, the quick return mirror is reset to the down position, and the aperture is driven to the fully open position, then the photographing operation is ended.

If it is judged in step S148 that the V4a exceeds the MAXa as the focused image tremble due to the hand tremble is large, it indicates that the focused image tremble along the horizontal axis is unable to be corrected. Accordingly, in step S160, the value of the V5a is copied to the V4a in order to stop the correction of the focused image tremble along the horizontal axis α. Therefore, the digital-rotational-driving-value V6a is set to "0" in step S152, so that the driving of the first motor 435 is stopped, and the optical axis of the correction lens 401 is maintained at the present position along the horizontal axis.

If it is judged in step S150 that the V4b exceeds the MAXb as the focused image tremble due to the hand tremble is large, it indicates that the focused image tremble along the vertical axis is unable to be corrected. Accordingly, in step S162, the value of the V5b is copied to the V4b in order to stop the correction of the focused image tremble along the vertical axis β. Therefore, the digital-rotational-driving-value V6b is set to "0" in step S152, so that the driving of the second motor 425 is stopped, and the optical axis of the correction lens 401 is maintained at the present position along the vertical axis.

As described above, if the focused image tremble is unable to be corrected in both the horizontal axis and the vertical axis, it is judged that both the V4a and the V4b respectively exceed the MAXa and MAXb in steps S148 and S150. Accordingly, the driving control of the motors 435 and 425 is stopped, so that the optical axis of the correction lens 401 is maintained at the present position along the horizontal and vertical axes. The subtraction of the V5a (V5b) from the V4a (Vb) is restarted, when the hand tremble is restrained, the focused image tremble becomes able to be corrected in the horizontal (vertical) direction, and the absolute value of the V4a (V4b) becomes less than the MAXa (MAXb). In accordance with the restart of the subtraction of step S152, the calculation of the driving amount of the motor 435 (425) is restarted.

As described above, according to this embodiment, after the release switch is tuned to the ON position, namely while an image capturing operation is being carried out, the frequency of the focused image tremble is judged, by measuring the elapse time from the previous reverse of the direction of the focused image tremble to the present reverse of the direction of the focused image tremble, and by comparing the elapse time with the predetermined value. If the frequency is higher than 20 Hz, the control of correcting the focused image tremble is stopped. Accordingly, extra members, such as a detecting switch which detects that a tripod is mounted on a camera, and a stop switch for stopping the control of correcting the focused image tremble, are unnecessary. Namely, an increase in a number of members in the camera is avoided. Further, the operation of the camera is facilitated, as it is unnecessary for a user to operate such switches as described above.

In this embodiment, the correction system 40 is mounted between the photographing lens group and the surface of the film F, however, the position of the correction system 40 is not restricted to this position. The correction system 40 can be situated in such a manner that the correction lens 401 is positioned among the lenses composing the photographing lens group. Further, the correction system 401 can be positioned on a side of the object from the photographing lens group. Namely, as long as the correction lens 401 is included in the photographing optical system, the position of the correction system 40 is independent of the position of the photographing lens group.

Further, in this embodiment, if the frequency of the focused image tremble is higher than 20 Hz along one of the horizontal and vertical axes, the correcting operation of the focused image tremble is stopped, in order to make extra drive of the motors minimum. However, it is possible to stop the driving of only the motor corresponding to the direction in which the frequency of the focused image tremble is higher than 20 Hz.

Note that, in this embodiment, the time interval between the previous reverse of the direction of the focused image tremble and the present reverse of the direction is set to 25 milliseconds, as the least upper bound of the frequency of the hand tremble is set to 20 Hz. However, it is possible that the least upper bound is set to 25 Hz. If the least upper bound is set to 25 Hz, the above mentioned time interval is 20 milliseconds. Accordingly, usually it is preferable that the time interval is set to approximately 25 milliseconds.

Further, this embodiment is explained using the reflex camera, however the correcting operation of the focused image tremble according to this embodiment can be applied to other types of optical devices which are provided with the function of correcting the focused image tremble, such as binoculars and so on.

As described above, according to the present invention, in the correcting device of the focused image tremble, the correction is controlled in accordance with the frequency of the focused image tremble.

The present disclosure relates to subject matter contained in the following Japanese Patent Application No. 11-102738 (filed on Apr. 9, 1999), which is expressly incorporated herein, by reference, in its entirety.

What is claimed is:

1. A device for correcting a tremble of a focused image comprising:

a tremble detector that detects a tremble of optical axes of an optical device;

correction optical systems that correct said tremble of said optical axes;

driving devices that drive said correction optical systems;

a controlling system that controls said driving devices in such a manner that a tremble of a focused image of an object due to said tremble can be canceled;

a reverse detector that detects a reverse of a direction of said optical axes tremble, detection of said reverse detector being repeatedly performed at a predetermined time interval; and a measuring system that measures a time interval, from a previous moment at which said reverse was detected, to a present moment at which said reverse is detected;

wherein said controlling system stops said driving devices if said time interval is shorter than a predetermined value.

2. The device of claim 1, wherein said predetermined value is set to approximately 25 milliseconds.

3. The device of claim 1, further comprising a tremble-direction-memorizing-system that judges a direction of said tremble by comparing a previous amount of said tremble at said previous moment and a present amount of said tremble at said present moment, and memorizes said direction;

wherein, when a present direction of said tremble judged at said present moment by said tremble-direction-memorizing-system is different from a previous direction of said tremble judged at said previous moment by said tremble-direction-memorizing-system, a reverse of said direction of said tremble is detected.

4. The device of claim 3, wherein said tremble-direction-memorizing-system judges said direction of said tremble by detecting an increase and a decrease between said previous amount and said present amount.

5. The device of claim 1, wherein said tremble detector can detect said tremble of said optical axis along two axes, and when said time interval, measured by said measuring system based on the result of detection of said reverse detector, is less than a predetermined value with respect to one axis of said two axes, said controlling system stops said correcting operation with respect to said two axes.

6. A camera which is provided with a device for correcting a tremble of a focused image comprising:

a photographing optical system;

a tremble detector that detects a tremble of an optical axis of said photographing optical system;

a correction optical system that corrects said tremble of said optical axis;

a driving device that drives said correction optical system;

a photographing controlling system that records an image of said object, controlling an image capturing operation;

a tremble correction controlling system that controls said driving device in such a manner that a tremble of a focused image of an object due to said tremble can be canceled;

a reverse detector that detects a reverse of a direction of said optical axis tremble, detection of said reverse detector being repeatedly performed at a predetermined time interval; and a measuring system that measures a time interval, from a previous moment at which said reverse was detected, to a present moment at which said reverse is detected;

wherein said tremble correction controlling system stops said driving device if said time interval is shorter than a predetermined value.

7. The camera of claim 6; wherein only while said image capturing operation is being carried out, said reverse detection by said reverse detector, said measuring of said interval by said measuring system, and said stopping operation of said driving device by said tremble correction controlling system are carried out.

8. The camera of claim 7; wherein said predetermined value is set to approximately 25 milliseconds.

9. The device of claim 6, further comprising a tremble-direction-memorizing-system that judges a direction of said tremble by comparing a previous amount of said tremble at said previous moment and a present amount of said tremble at said present moment, and memorizes said direction;

wherein, when a present direction of said tremble judged at said present moment by said tremble-direction-memorizing-system is different from a previous direction of said tremble judged at said previous moment by said tremble-direction-memorizing-system, a reverse of said direction of said tremble is detected.

10. The device of claim 9, wherein said tremble-direction-memorizing-system judges said direction of said tremble by detecting an increase and a decrease between said previous amount and said present amount.

11. The camera of claim 6, wherein said tremble detector can detect said tremble of said optical axis along two axes, and when said time interval, measured by said measuring system based on the result of detection of said reverse detector, is less than a predetermined value with respect to one axis of said two axes, said controlling system stops said correcting operation with respect to said two axes.

* * * * *